United States Patent Office 3,226,380
Patented Dec. 28, 1965

3,226,380
POLYHYDROXY MATERIALS CONTAINING ION-EXCHANGE GROUPS AND NON-IONIC SUBSTITUENTS AND THEIR METHOD OF PREPARATION
Colin Sutherland Knight, Maidstone, Kent, England, assignor to W. & R. Balston Limited, Maidstone, England, a British company
No Drawing. Filed Nov. 13, 1961, Ser. No. 152,079
Claims priority, application Great Britain, Nov. 18, 1960, 39,746
10 Claims. (Cl. 260—212)

The invention relates to materials containing ion-exchange groups.

According to the present invention there is provided a method of preparing a material containing ion-exchange groups by introducing into a polymer the desired ion-exchange groups, which process comprises both treating the polymer to form an ion-exchange material and also treating the polymer to introduce into the polymer structure one or more substituents which have the effect of varying the hydrophilic properties of the polymer chain. By ion-exchange group is meant a group which is ionised or which is capable of being ionised. An example of the former group is a sulphonic acid group and an example of the latter group is a carboxylic acid group which will, of course, be ionised only in certain media.

I have discovered that the nature of the matrix of a material containing ion-exchange groups plays an important part in the absorptive effect of the material and that the absorptive effect may be dominant when the absorbed compounds are, for example, amino acids. Accordingly by preparing a series of ion-exchange materials containing different amounts of a substituent which varies the hydrophilic properties of the polymer chain, it is possible to produce a series of ion-exchange materials which will exhibit different retentivities to absorbed ions.

The substituent which varies the hydrophilic properties of the chain may be introduced either before or after the introduction of the ion-exchange groups.

Included within the scope of the present invention, therefore, there is a whole range of ion-exchange materials such as, for example, the conventional synthetic ion-exchange resins in which the polymer matrix has been treated to introduce alkyl side chains, hydroxyalkyl (such as hydroxyethyl) side chains, or nitro groups. It is to be understood that these examples are by way of illustration only and many other examples will be apparent to those skilled in the art.

Examples of specific materials produced by the method of the present invention are as follows:

Sulphethoxybenzyl cellulose,
Benzylated aminoethyl cellulose,
Sulphethoxy acetyl cellulose,
Ethyl triethylaminoethyl cellulose.

A particular aspect of this invention relates to cellulosic ion-exchange material which have been treated to confer ion-exchange properties and also treated to vary the hydrophilic properties of the polymer chain.

Examples of materials containing ion-exchange groups which may be further treated in accordance with the present invention are phosphorylated cellulose, carboxymethylcellulose, sulphethoxy cellulose, diethylaminoethyl cellulose, triethylaminoethyl cellulose or cellulose reacted with a mixture of epichlorhydrin and triethenolamine (the so-called ECTEOLA cellulose); these ion-exchange celluloses may be further treated to vary the hydrophilic properties of the polymer chain. The substituent which varies the hydrophilic properties of the cellulose chain may be an alkyl group having for example up to 6 carbon atoms, e.g. methyl, ethyl or propyl, a benzyl group, or an acyl group such as an acetyl or propionyl group. These are examples of the many types of substituents which may be introduced into the cellulose chain in accordance with the present invention.

Ion-exchange materials in accordance with the invention may be in the form of ion-exchange papers in sheet or reel form, fibres, powders, membranes, sponges or in bead form depending upon the nature of the polymeric chain of the material.

The method of the present invention may be applied to polymeric starting materials into which non-ionic and ionic groups may be substituted; for the purpose of the present invention preferred polymeric materials are those of the polyhydroxy type, examples of which will readily occur to those skilled in the art. However, particular mention may be made of the following materials: cellulose; starch; polyvinyl alcohol, polyacrylyl alcohol, etc. and copolymers of vinyl alcohol and acrylyl alcohols. The polymeric materials may be cross-linked to varying degrees as required for any particular application.

Preferably the ion-exchange group is one which will produce a strong ion-exchanger; however, the ion-exchange group may lead to a weak ion-exchanger.

Examples of the former type of group are sulphonic acid groups and quaternary ammonium groups and examples of the latter are: carboxylic acid groups and primary, secondary and tertiary amino groups.

Following is a description by way of example of methods of carrying the present invention into effect.

EXAMPLE I

*Preparation of benzyl sulphethoxy cellulose*

30 g. of cellulose were mercerised with 750 ml. of 18% sodium hydroxide (w/w) solution and pressed to 120 g. The mercerised cellulose was added to 600 ml. of benzyl chloride at 100° C. The mixture was heated with stirring under reflux for 5 hours at 100° C. The product was washed with 1½ litres of acetone followed by washing with water until the washings were neutral. The resulting material was then extracted with alcohol for four days. This product was dried at 60° C. for 24 hours. The final weight was 36 g. and the product had a degree of substitution with respect to benzyl of 0.83.

6 g. of benzyl cellulose were mercerised with 100 ml. of 30% alkali and pressed to 16 g. 9 g. of sodium 2-bromoethane sulphonate were mixed in for 5 minutes and the mixture heated at 100° C. for five hours. The product was washed with water, 0.5 N HCl, water and 0.5 N sodium hydroxide and finally with water. The ion-exchange capacity of the product was 0.2 meq./dry g.

A paper was prepared from bleached cotton linter pulp mixed with the thus prepared benzyl sulphethoxy cellulose. The cotton linter pulp was beaten so that sheets prepared from this pulp at 100 gm./m.$^2$ had a porosity of 500 seconds, the porosity of a sheet being defined here as the time taken for 100 cc. of air to pass through a one square inch area of the sheet at a standard pressure when the air is at a standard temperature and humidity. The paper contained 50% by weight of benzyl sulphethoxy cellulose.

A paper product made according to the above example and used for the chromatographic separation of amino acids exhibited a similar selectivity for the amino acids to that exhibited by a sulphonated polystyrene resin. This selectivity was significantly different from that exhibited by a strong cation exchange cellulose such as sulphethoxy cellulose.

EXAMPLE II

*Preparation of benzyl DEAE cellulose*

5 g. of benzyl cellulose made according to Example I were mercerised with 125 ml. of 18% sodium hydroxide (w/w) solution and pressed to 20 g. 5 g. of diethylaminoethyl chloride hydrochloride in 5 ml. of water was added and the mixture stirred. The mixture was heated at 70° C. for 2 hours after which the product was washed with water, 0.5 N HCl, water, 0.5 N sodium hydroxide and finally with water and then dried. The nitrogen content of the resulting benzyl diethylamino ethyl cellulose was 1.0%.

EXAMPLE III

*Preparation of methyl sulphethoxy cellulose*

5 g. of cellulose were mercerised with 125 ml. of 18% sodium hydroxide (w/w) solution and pressed to 20 g. The alkali cellulose was then stirred with 200 ml. of toluene. 1 g. of dimethyl sulphate was added and the mixture was stirred for 2 hours. The product was washed with ether, 0.5 N hydrochloric acid and finally with water. The product had a degree of substitution with respect to methyl of 0.5.

5 g. of the above methyl cellulose was mercerised with 125 ml. of 18% sodium hydroxide (w/w) solution and pressed to 20 g. 3.5 g. of sodium 2-bromoethane sulphonate was added and the mixture heated at 100° C. for four hours. The product was washed with water, 0.5 N HCl, water and 0.5 N sodium hydroxide and finally with water. The dried product had an ion-exchange capacity of 0.5 meq./dry g.

EXAMPLE IV

*Preparation of methyl carboxymethylcellulose*

5 g. of methyl cellulose prepared according to Example III were mercerised with 125 ml. of 18% sodium hydroxide (w/w) solution and pressed to 20 g. 7 g. of sodium chloroacetate in 10 ml. of water were added. The mixture was heated at 50° C. for four hours. The product was washed with 0.5 N HCl and water. The ion-exchange capacity of the product was 0.4 meq./dry g.

EXAMPLE V

*Preparation of epichlorhydrin-phenyl sulphethoxy cellulose*

5 g. of cellulose were mercerised with 125 ml. of 18% sodium hydroxide (w/w) solution and pressed to 20 g. 15 g. of phenol in 35.5 g. of 18% sodium hydroxide (w/w) solution were mixed in and 20 ml. of epichlorhydrin added. The mixture was boiled under reflux for 1½ hours. The product was washed with water, 0.5 N HCl, acetone and finally with water. The weight of the product after drying at 60° C. for six hours was 7 g.

5 g. of epichlorhydrin phenyl cellulose prepared as described above were mercerised with 125 ml. of 18% sodium hydroxide (w/w) and pressed to 18 g. 3.5 g. of sodium 2-bromoethane sulphonate were carefully mixed in and the mixture heated to 100° C. for 4 hours. The product was washed with water, 0.5 N HCl, water, 0.5 N sodium hydroxide and finally with water. The ion-exchange capacity of the product was 0.5 meq./g. dry.

EXAMPLE VI

*Preparation of epichlorhydrin-phenyl sulphethoxy starch*

5 g. starch were dissolved in 25 ml. of 5 N NaOH and 25 ml. of epichlorhydrin was added. A solution of 20 g. of phenol in 42.5 g. 5 N NaOH was added and the mixture heated at 60° for 8 hours. The product was washed with aqueous alcohol and dried at 60° C. for 16 hours.

5 g. of epichlorhydrin-phenyl starch were mixed with 15 ml. of 5 N sodium hydroxide and 5 g. of sodium 2-bromoethane sulphonate and the mixture heated at 100° C. for 4 hours. The product was washed with water, 0.5 N HCl, water, 0.5 N sodium hydroxide and finally with water. The ion-exchange capacity of the product was 0.8 meq./dry g.

EXAMPLE VII

*Preparation of epichlorhydrinphenyl sulphethoxy polyvinyl alcohol*

5 g. of PVA (polyvinyl alcohol) were dissolved in 25 ml. of 5 N NaOH and 25 ml. of epichlorhydrin were added. A solution of 20 g. of phenol in 42.5 g. 5 N NaOH was added and the mixture heated at 60° for 8 hours. The product was washed with aqueous alcohol and dried at 60° C. for 16 hours.

5 g. of epichlorhydrin-phenyl PVA was mixed with 16 mls. of 5 N sodium hydroxide and 5 g. of sodium 2-bromoethane sulphonate and the mixture heated at 100° C. for 4 hours. The product was washed with water, 0.5 N HCl, water, 0.5 N sodium hydroxide and finally with water. The ion-exchange capacity of the product was 1.0 meq./dry g.

It has been discovered that the matrix of an ion-exchange material contributes to the strength of binding of a particular ion in a characteristic manner. A hydrophilic matrix such as exists in a cellulose ion-exchanger will result in the ion-exchanger exhibiting increasingly high affinity for organic ions which possess increasingly hydrophilic side chain structures. Such an ion-exchanger can, therefore, differentiate between ions with hydrophilic side chains and ions with a hydrophobic character as resulting from, for example, hydrophobic side chains; this differentiation takes place even though the ionising characteristics of such ions may be similar. We have discovered that high selectivity is, therefore, dependent upon the matrix of the ion-exchanger exhibiting extreme hydrophilic or alternatively hydrophobic characteristics.

The present invention may be employed to change the nature of an ion-exchanger by removing its hydrophilic characteristics and forming corresponding hydrophobic characteristics. The introduction of a limited hydrocarbon character into, for example, cellulose would cause the resulting ion-exchanger (after the introduction of ion-exchange groups) to exhibit increased affinity for ions with hydrophobic side chains while retaining a proportion of the original affinity for ions with hydrophilic side chains. This would lead to an ion-exchanger having a loss of selectivity. It is necessary, therefore, in order to produce ion-exchangers by the present invention, which are particularly useful for the separation by chromatographic techniques of ionic species to remove the hydrophilic nature of a polyhydroxy-type material to such an extent that the hydroxyl groups exhibit little or no practical effect upon the final performance of the ion-exchange material.

In the idealised case when the ion-exchange material is based on cellulose, removal of the hydrophilic character of the cellulose would be achieved by substituting hydrocarbon groups into two of the three glucose hydroxyl groups and substituting into the third hydroxyl group, the desired ion-exchange group.

It will be appreciated that the degree of substitution of the substituents which have the effect of varying the hydrophilic properties of the polymer chain, and also the amount of ion-exchange groups introduced into the polymer may be varied over wide ranges in any particular case. Because of the difficulty of placing precise limits on these two features, one must adopt to some extent a trial and error approach to producing ion-exchange materials in accordance with this invention which are required for a particular purpose.

The following Table I illustrates in the case of one particular ion-exchange species, namely sulphethoxy benzyl cellulose, the effects of a wide range of degrees of substitution of the benzyl groups and the ion-exchange capacity. The evaluation of various ion-exchangers has been carried out employing a series of amino acids. In the table the abbreviations have the following meanings:

Orn represents ornithine
Lys represents lysine
Ser represents serine
Ala represents alanine
Gly represents glycine
Val represents valine
Leu represents leucine

TABLE I

| Sample No. | Benzyl Content D.S. | Ion-Exchange Capacity, meq./dry g. | Performance—Sequence of increasing affinities for exchanger | | | Departure from Typical Cellulose Performance |
|---|---|---|---|---|---|---|
| | | | Orn and Lys | Ser and Ala | Gly, Ala, Val and Leu | |
| 1 | 0.04 | 0.53 | Lys<Orn | Ala<Ser | Leu<Val<Ala=Gly | Negligible. |
| 2 | 0.06 | 0.34 | Lys<Orn | Ser=Ala | Leu<Val<Ala<Gly | Do. |
| 3 | 0.09 | 1.04 | Orn<Lys | Ser<Ala | Ala<Val<Leu<Gly | Small. |
| 4 | 0.10 | 0.16 | Orn<Lys | Ser<Ala | Ala=Val<Leu<Gly | Do. |
| 5 | 0.14 | 0.55 | Lys<Orn | Ala<Ser | Leu<Val<Ala<Gly | Negligible. |
| 6 | 0.24 | 0.50 | Lys<Orn | Ala<Ser | Ala<Leu<Val<Gly | Do. |
| 7 | 0.26 | 0.15 | Orn<Lys | Ser<Ala | Ala=Val<Gly=Leu | Moderate. |
| 8 | 0.83 | 0.20 | Orn=Lys | Ser<Ala | Gly<Ala<Val<Leu | Considerable. |
| 9 | 0.83 | 0.19 | Orn=Lys | Ser<Ala | Gly<Ala<Val<Leu | Do. |
| 10 | 0.72 | 0.16 | Orn<Lys | Ser<Ala | Val=Ala=Gly<Leu | Do. |
| 11 | 1.00 | 0.08 | Lys<Orn | Ala<Ser | Gly<Ala<Val=Leu | Negligible. |

The properties and performances of the various sulphethoxy benzyl celluloses are as set forth in the table. The various materials were incorporated into paper, in a similar manner to that employed in the foregoing Example I and the resulting papers were employed with chromatographic techniques to determine the sequences of these amino acids as a result of development. The resulting sequences were used to determine departure from typical cellulose performance.

It will be appreciated that the attainment of uniform substitution, in the case of cellulose, of non-ionic and ionic substituents is very difficult in practice. The benzylation of the materials listed in Table I was effected by reaction of cellulose with benzyl chloride and alkali. Benzyl chloride is not miscible with aqueous alkali and the reaction is therefore heterogeneous. Interaction with the benzyl chloride will occur initially on the surface of the cellulose fibres and regions of benzyl cellulose produced in this way will swell preferentially in the benzyl chloride and will thus become preferred sites for further benzyl substitution. The resulting product possesses a non-uniform benzyl character.

Benzylation may be carried out at different temperatures and generally the lower the temperature the more uniform is the substitution of benzyl groups. Referring to the table, the benzylation step of samples Nos. 4, 5, 6 and 7 was carried out at 70° C., that of sample No. 8 at 80° C., those of samples 1, 2, 3 and 11 at 90° C. and those of samples 9 and 10 at 100° C. The uniformity of benzyl content might be expected to decrease with increasing temperature, such that the higher benzyl content samples, e.g. samples Nos. 9, 10 and 11, probably contain regions with degrees of substitution of 2 or even higher, i.e. regions in which the benzyl content is ideal. The departure from cellulose characteristics is likely to be due entirely to these regions. On the other hand, a moderate departure from typical cellulose behaviour was obtained with a sample having a benzyl D.S. of 0.26 (No. 7), which would be expected to be more uniform because the reaction was carried out at a lower temperature. The ion-exchange capacities of Nos. 7, 9 and 10 are similar. Similarly, a small departure from typical cellulose behaviour was observed with sample No. 4 which had a benzyl D.S. of only 0.10 and a similar ion-exchange capacity to the previously mentioned samples.

Although the extent of departure from cellulose behaviour would increase with increasing ion-exchange capacity on any particular uniformly substituted benzyl cellulose, with a non-uniform product increase in ion-exchange capacity may have the reserve effect as the extra ionic groups may be located in regions of purely cellulose character.

It will be appreciated, therefore, that it is extremely difficult to propose values for minimum desirable degrees of substitution but when regions of cellulose are benzylated under heterogeneous conditions, it is preferred that the benzyl content should be such as to provide a degree of substitution of 1.

With regard to substitution of the ionic groups, interaction of benzyl cellulose with sulphethoxy chemical has been carried out in aqueous alkaline medium. Such conditions might be expected to swell (preferentially) regions of the benzyl cellulose with low D.S. On this basis ionic groups would not necessarily be located in regions containing benzyl groups, unless the benzyl cellulose itself is uniformly substituted. Referring again to Table I, ion-exchange capacities as low as 0.19 (No. 9) are sufficient to cause considerable departure from typical cellulose behaviour when the benzyl content is a relatively non-uniform D.S. of 0.83. Again sample No. 7 shows a moderate departure from typical cellulose behaviour even though the ion-exchange capacity is only 0.15 and the benzyl D.S. 0.26. It would seem that such a derivative would contain benzyl and sulphethoxy groups in separate regions and thereby retain the full cellulosic character of the polymer structure.

One explanation which would fit these facts is that reaction is restricted to near the surface of the cellulose fibres both in the case of benzylation and sulphonation, with the benzyl character of the surface effectively inhibiting penetration of alkali into the fibre during sulphonation. Sulphonic groups are, therefore, of necessity located in regions of some, perhaps high, benzyl content. Therefore, with cellulosic exchangers of the above type, a minimum ion-exchange capacity of about 0.2 meq./dry g. are preferred in the ion-exchange materials according to the invention.

Samples Nos. 5 and 6 which had a higher capacity than the majority of the other samples yet which showed no departure in performance from that of unmodified cellulose were subjected to ultrasonic agitation at the sulphonation stage only. This treatment was thought to break down the benzyl groups such that the final product was little more than sulphethoxy cellulose. This method of agitation is considered to be unsuited to this purpose. (Benzyl contents quoted in Table I were determined before sulphonation.)

The invention is not limited to the foregoing specific examples as it is to be clearly understood that the modification of the hydrophilic nature of the polymer chain may be effected with all polymeric chains which can be chemically reacted to introduce the substituent groups which have the property of varying the hydrophilic properties of the polymer chain.

I claim:

1. A method of preparing a water-insoluble cellulose derivative containing ion-exchange groups which method comprises introducing into a cellulosic material ion-exchange groups which render the product capable of undertaking reversible exchange of ions in aqueous solution, mixing with the cellulosic material a monofunctional reagent, capable of substituting for the hydroxyl groups of the cellulose non-ionic substituent groups which are attached to the cellulosic material by one linkage only and of thereby inducing selective interaction effects between the thus modified cellulose matrix and an exchanging ion, effecting said substitution reaction between said cellulosic material and said reagent, and recovering the resulting product, thereby producing a material whose ion-exchange properties are substantially different from those of a corresponding ion-exchange material having no non-ionic substituent groups.

2. A method as claimed in claim 1 wherein the average degree of substitution of the non-ionic substituent groups for the hydroxyl groups of the cellulose is at least 1 for each glucose group of the cellulose chain.

3. A method as claimed in claim 1 in which the final product has an ion-exchange capacity of at least 0.2 meq./g.

4. A water-insoluble ion-exchange polyhydroxy material when prepared by the method claimed in claim 3.

5. A method of preparing a water insoluble derivative of a polyhydroxy material selected from the group consisting of cellulose, polyvinyl alcohol and starch, containing a cellulose, polyvinyl alcohol and starch, containing ion-exchange groups, which method comprises introducing into a polyhydroxy material ion-exchange groups which render the product capable of undertaking reversible exchange of ions in aqueous solution, mixing with the polyhydroxy material a monofunctional reagent, capable of substituting for the hydroxyl groups of the material non-ionic substituent groups which are attached to the polyhydroxy material by one linkage only, and of thereby inducing selective interaction effects between the thus modified matrix and an exchanging ion, effecting said substitution reaction between said polyhydroxy material and said reagent and recovering the resulting product, thereby producing a material whose ion-exchange properties are substantially different from those of a corresponding ion-exchange material having no non-ionic substituent groups.

6. A method of preparing a water-insoluble cellulose derivative containing ion-exchange groups which method comprises introducing into a cellulosic material ion-exchange groups which render the product capable of undertaking reversible exchange of ions in aqueous solution, mixing with the cellulosic material a reagent, capable of substituting for the hydroxyl groups of the cellolose non-ionic substituent groups selected from the class consisting of —R and —$CH_2$—CH(OH)—$CH_2$—O—R' where R is a monovalent organic radical selected from the group consisting of alkyl groups having from 1 to 6 carbon atoms and a benzyl group, and R' is a phenyl group and of thereby inducing selective interaction effects between the thus modified cellulose matrix and an exchanging ion, effecting said substitution reaction between said cellulosic material and said reagent, and recovering the resulting product, thereby producing a material whose ion-exchange properties are substantially different from those of a corresponding ion-exchange cellulosic material having no non-ionic substituent groups.

7. A method of preparing a water-insoluble cellulose derivative containing ion-exchange groups which method comprises introducing into a cellulosic material ion-exchange groups which render the product capable of undertaking reversible exchange of ions in aqueous solution, mixing with the cellulosic material a reagent selected from the group consisting of benzyl chloride, dimethyl sulphate and epichlorohydrin-phenyl, capable of substituting for the hydroxyl groups of the cellulose non-ionic substituent groups and of thereby inducing selective interaction effects between the thus modified cellulose matrix and an exchanging ion, effecting said substitution reaction between said cellulosic material and said reagent, and recovering the resulting product, thereby producing a material whose ion-exchange properties are substantially different from those of a corresponding ion-exchange material having no non-ionic substituent groups.

8. A method of preparing a water-insoluble cellulose derivative containing sulfethoxy ion-exchange groups which method comprises introducing said sulfethoxy groups into a cellulosic material, mixing benzyl chloride with the cellulosic material and effecting a substitution reaction whereby non-ionic benzyl groups are substituted for the hydroxyl groups and thereby are capable of inducing selective interaction between the thus modified cellulose matrix and an exchanging ion and recovering the resulting product, thereby producing a material, whose ion-exchange properties are substantially different from those of a sulfethoxy ion exchange cellulose material having no non-ionic benzyl substituent groups.

9. A method as claimed in claim 8 in which benzylation is effected at a temperature of 70° C. to 100° C.

10. A water-insoluble ion-exchange cellulosic material when prepared by the method of claim 1.

References Cited by the Examiner

UNITED STATES PATENTS 3,042,667    7/1962    Flodin _____ 260—209

OTHER REFERENCES

Dual et al.: Ind. and Eng. Chem. volume 46, pages 1042–1045 (1954).

Calmon et al.: Ion Exchangers in Organic and Biochemistry, page 559, Interscience Publishers, New York (1957).

WILLIAM H. SHORT, *Primary Examiner.*

J. R. LIBERMAN, *Examiner.*